Sept. 29, 1964  J. A. CARLSON  3,150,471
METHOD OF MATCHING DUPLEX BEARINGS
Filed Oct. 29, 1962
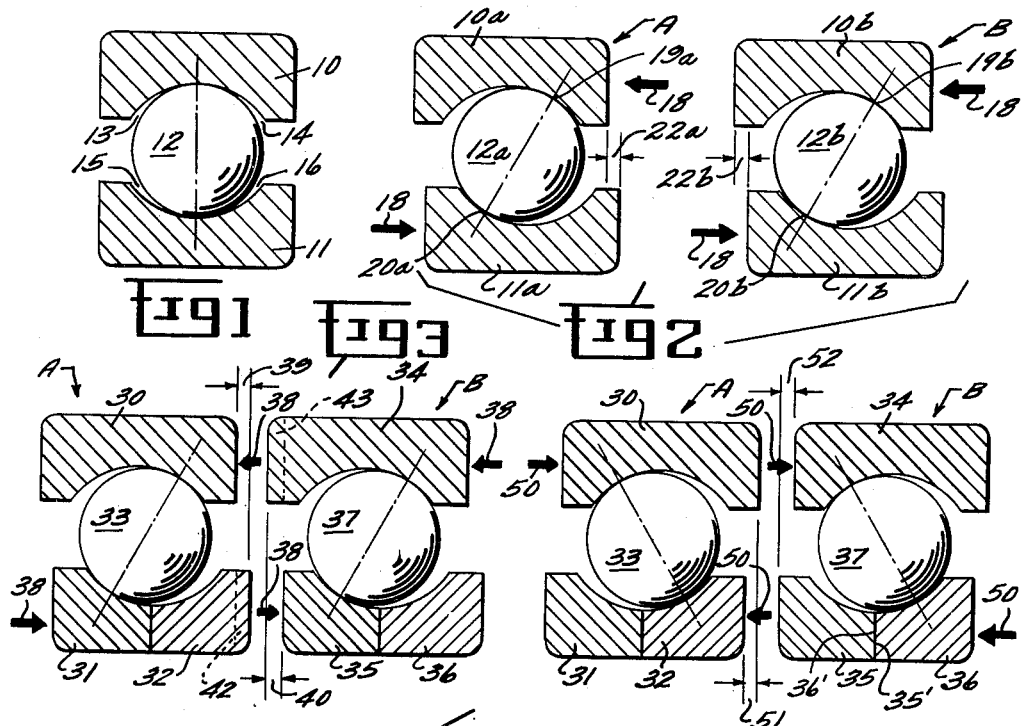
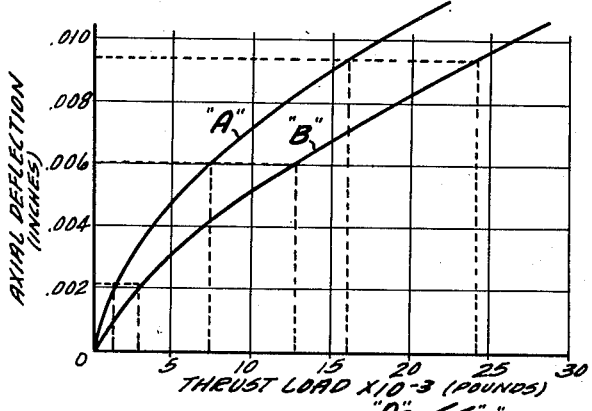
LOW GAGING LOAD
MATCHING
Fig 5
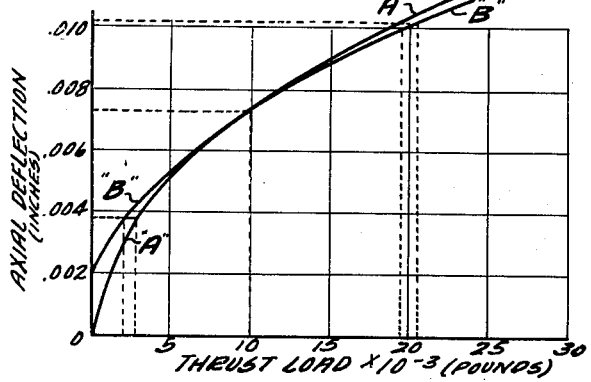
Fig 6
HIGH MEDIAN LOAD
MATCHING
INVENTOR.
JEROME A. CARLSON
BY
Gerald L. Moore
ATTORNEY- 3,150,471
METHOD OF MATCHING DUPLEX BEARINGS
Jerome A. Carlson, Scottsdale, Ariz., assignor to General
Electric Company, a corporation of New York
Filed Oct. 29, 1962, Ser. No. 233,655
4 Claims. (Cl. 51—291)

This invention relates to a method of matching duplex or multiple bearings and, more particularly, a method of matching two or more bearings such that the bearings share the load equally when subjected to axial directed loading.

Because heavy loads must frequently be supported by bearing assemblies, it is sometimes necessary to use duplex or multiple bearings, that is to utilize two or more bearings located adjacent one another to support the load. However, problems arise when the bearings must react axially directed loads because it is very likely that the paired bearings are not alike in their free endplay and load-deflection characteristics and therefore, as is frequently the case, one bearing will support most of the axially directed load in one or both directions thereby resulting in reduced fatigue life and excessive wear of that bearing. It is generally believed that the life of a bearing varies inversely with the cube of the load and such unequal loading causes reduced fatigue life and excessive unequal wearing problems where duplexed bearings are utilized. To counteract this the bearings must be designed for much greater capacity and durability than that ordinarily necessary to carry the load, however if the bearings are matched such that they will share, substantially equally, loads in either axial direction, each bearing assembly will have a maximum fatigue life and wear of each assembly will be nearly equal.

It is accordingly one object of the invention to provide a method of matching such bearings so that each bearing will carry a substantially equal bearing load when duplexed even though subjected to axial loading in one or both directions.

According to the present invention individual bearings to be matched are deflected axially under a median load first in one direction and then in the opposite direction and the total free endplay and load-deflections measured. Bearings are paired so that the bearing having a circumferentially split inner race and the larger total free endplay and load-deflections is in the aft position. The bearings in the pair are thereafter individually deflected under a median load applied against the forward inner rings and the adjacent faces or the faces that will contact the other bearing, are machined so that the face offset of each bearing is zero or equal to the face offset of the other bearing. Thereafter the bearings are deflected under a median load in the opposite direction and the adjacent face offsets measured. The smaller face offset is subtracted from the larger face offset of the split inner race bearing and this difference is ground from the inside faces of the split race. The free endplay and load-deflections, the sum of the two directional face offsets, of both bearings have therefore been equalized so that under twice the median load both bearings when paired share load equally in both directions. It is apparent that this method can also be applied to bearings having circumferentially split outer races; it is only necessary to ensure that the one bearing having the greater total free endplay and load-deflections has a split race and that grinding of the inside faces of this split race to match the bearings in one direction does not affect the previous matching of adjacent faces of the bearing pair in the opposite direction. This can be accomplished by proper placement of the adjacent bearings. This method can be used for two or more bearings which are to be used in a tandem duplex mounting.

Other objects and many of the attendant advantages of this invention will be readily appreciated as the same becomes better understood by reference to the following detailed description when considered in connection with the accompanying drawings wherein:

FIG. 1 illustrates a standard bearing with a centered ball,

FIG. 2 illustrates a pair of bearings deflected by an axial load,

FIG. 3 illustrates a pair of split race bearings deflected in one axial direction for measurement of the deflection, FIG. 4 illustrates the same pair of split race bearings deflected by an axial load in the other direction for deflection measurement, FIG. 5 illustrates graphically the variation in load-deflection characteristics of individual bearings matched under a light gaging load, and FIG. 6 illustrates the relative loads carried by a pair of duplexed bearings matched by the subject method under a large median load.

Referring now to FIG. 1 wherein is illustrated a standard bearing having an outer race 10 and an inner race 11 with a ball 12 therebetween, as was pointed out heretofore, frequently it is necessary to employ bearings wherein they will react axially directed thrusts or loads, however as can be seen in this figure there is considerable room between the ball 12 and the outer race 10 as indicated at points 13 and 14 and the same is true between the ball and the inner race 11 as indicated at points 15 and 16. As a small gaging axially-directed force is impressed on the bearing, the ball tends to roll to the side within the races to allow the races to move axially until contact is made between the ball and the races. This is referred to as "free endplay" of the bearing. As the load is increased beyond a small gaging load elastic deflection of the bearing races and balls occurs. As illustrated by FIG. 5, this load-deflection is variable from bearing to bearing.

To better illustrate this, a pair of duplex bearings such as illustrated in FIG. 2 by A and B, are frequently necessary when the bearing loads exceed the bearing load capable of being endured by one bearing alone. As was also pointed out heretofore, it is extremely difficult to find two bearings having equal free endplay and load-deflections in both directions to allow the bearings to always share an impressed load equally. However, as in FIG. 2, an axial force 18 directed against each bearing causes the points of contact 19a and 19b between the outer races 10a and 10b and the balls 12a and 12b respectively to move axially while the points of contact 20a and 20b between the inner races 11a and 11b and the balls 12a and 12b respectively are moved axially in the opposite direction. The balls will ride up on the races to counteract the axial load 18. Providing the deflections (face offsets) 22a and 22b are equal, and the bearings are paired, the balls will counteract equally the respective races at the same deflection (face offset) and therefore each bearing will carry approximately one-half an axially directed load equal to twice the value of axial force 18. However, if these deflections (face offsets) 22a and 22b are not equal and the bearings are paired, one ball will load both races before the other ball and the bearing with the least deflection (face offset) will thereafter carry most or all of that axially directed load.

In order to equalize the axially directed load bearing capabilities of multiple or duplex bearings, the subject invention is employed wherein, referring now to FIGS. 3 and 4, a pair of bearings A and B are selected with at least one race being of the split race type, in this illustration it is both inner races. For instance here the bearing A has an outer race 30 and a split inner race comprised of race segments 31 and 32 with a ball 33, while the bearing B has an outer race 34 with a two-part inner race composed of race segments 35 and 36 with a ball 37.

To accomplish a matching of these bearings, a force 38 is impressed on both inner races of the bearings, this force preferably being the approximate median axially directed load to which the bearings will be subjected. The deflections 39 and 40 are thereafter measured. A force 50 is then impressed on both inner races of the bearings, this force also being somewhere near the median load to be carried by the bearing in this direction or in a direction opposite to the direction of force 38. Deflections 51 and 52 are then measured. The deflections or face offsets 39 and 51 are added together and the deflections 40 and 52 are added together. The bearing which has the greatest deflection (free endplay plus load-deflections) is placed on the right hand side comparing to the position of the bearing comprising races 34, 35 and 36 and ball 37. To now match the faces of these bearings which during usage will be situated with their races in close proximity, the dimension 39 is removed from the inner race segment 32 as indicated by the dotted section 42 while the deflection 40 is removed from the outer race 34 as indicated by the dotted section 43—or the faces are ground such that dimension 39 equals dimension 40. Thereafter, when the bearings are located in their normal abutting position and an axial force is impressed from left to right on the inner race, the balls will load the races at the same time to react this load and thereafter each of the bearings will react approximately one-half the total axially directed load.

To complete the matching of the bearings, it is now necessary to cause the bearings to carry equal loads in the other axial direction, or react a force from the right to left as indicated by the load 50. To accomplish this matching the bearings are subjected to a force 50, this force preferably also being somewhere near the median load to be carried by the bearings in this direction, and the deflections 51 and 52 are measured. Because of the prior arranging of the bearings deflection 52 will be greater than deflection 51. Deflection 51 is subtracted from deflection 52 giving a differential deflection dimension. Thereafter this dimension is machined from the inside faces of the inner race of the bearing having the greater deflection. For instance, if the deflection or face offset of bearing A is .020 inches and the deflection of bearing B is .024 inches, the difference is .004 inches and this dimension is removed from the inside faces between the inner race segments 35 and 36, or .002 inches if removed from the inside face 35′ of segment 35 and .002 inches is removed from the inside face of 36′ of race segment 36. In this manner the deflection in the right to left direction are equalized while not affecting the originally equalized deflections in the left to right direction and the bearings are matched for duplex operation to react axially directed loads in a substantially equal manner in either direction.

In removing the differential deflection from the inside faces of the split inner race, the complete deflection may be removed from one half of the race if necessary, however, this might cause a difference in height of the race which might be objectionable. Furthermore, either the inner or outer races may be split to allow the removal of the second differential deflection and also only one bearing need have a split race so long as that bearing has a greater two-way deflection (free endplay plus load-deflections) than the other bearing.

From the foregoing it is apparent that the subject method allows for matching of multiple bearings, for instance as illustrated in FIG. 5 where the bearings have been matched for duplex operation under a small gaging load the bearings may not carry equal loads at high load levels as illustrated and heretofore discussed. However, as illustrated in FIG. 6, where the bearings are properly matched and are loaded for matching at approximately the median load where possible, the bearings will carry approximately equal axial loading thereby resulting in longer life and better bearing utilization. Note that where the matching of the bearings is not equal the bearings are under light loading conditions and therefore either may react the load easily with no excessive wear and little adverse effect on fatigue life.

While particular embodiments of the invention have been illustrated and described, it will be obvious to those skilled in the art that various changes and modifications may be made without departing from the invention and it is intended to cover in the appended claims also changes and modifications that come within the true spirit and scope of the invention.

What is claimed as new and desired to be secured by Letters Patent of the United States is:

1. The method of matching a pair of duplexed bearings to share equally two directional axially directed loads with at least one bearing having a circumferentially split race comprising the following steps:

deflecting each bearing in a first direction by applying an equal axial directed force on corresponding races while holding the other race of each bearing stationary, measuring this first deflection between one outer and one inner race face of each bearing, deflecting each bearing in the other or second direction by applying an equal axial directed force on corresponding races in the opposite direction while holding the other race of each bearing stationary, measuring this second deflection between the same outer and inner race faces, of each bearing, that were measured in obtaining the first deflection, adding the first deflection to the second deflection of each bearing to obtain a total deflection for each bearing, grinding the surface of adjacent projecting race faces until these race faces of the bearings are flush or project equally when deflected by the axial force in the first direction, subtracting the smaller measured total deflection from the larger measured total deflection to obtain a differential deflection measurement, grinding from the inside faces of said split race of the bearing having the greater total deflection the differential deflection measurement.

2. The method of matching multiple bearings to share equally two directional axially directed loads wherein all have a circumferentially split race with inner abutting faces, comprising the following steps:

deflecting each bearing in one direction by applying an equal axial directed force on the corresponding races of each bearing, deflecting each bearing in the other direction by applying an equal axial directed force on the corresponding races of each bearing in the opposite direction, measuring the total relative axial movement of the inner race with respect to the outer race as the axial load is applied in one direction and then the opposite direction, arranging the bearings in the order of increasing total axial movement, grinding the abutting race faces of the first and second bearings having the smaller axial deflections until these faces are equally offset when deflected by the axial force in one direction, subtracting the smaller measured relative axial movement of the first bearing from the larger relative movement of the second bearing to obtain a differential axial movement, grinding material equal to this differential axial measurement from the abutting inner race faces of the split race of the second bearing.

3. The method as claimed in claim 2 with the additional step added:

pairing the second bearing with a third bearing and repeating the steps as outlined for the first and second bearings.

4. The method of matching a pair of bearings so that each will share equally two directional axially directed loads when used together comprising the following steps:

deflecting each bearing in a first axial direction by applying an equal axial directed force on the races of each bearing, measuring the face offsets of the adjacent race faces, deflecting each bearing in the second axial direction by applying an equal axial directed force on the races of each bearing, measuring the face offset of said bearing race faces in this direction, adding the two face offset measurements to obtain a total deflection measurement for each bearing, subtracting the smaller total deflection measurement from the larger total deflection measurement to obtain a differential total deflection, grinding the adjacent abutting race faces of the bearings until these faces are equally offset when deflected by the axial force in one direction, splitting circumferentially one race of the bearing having the larger total deflection and grinding the differential total deflection from the inside faces of said split race.

References Cited in the file of this patent

UNITED STATES PATENTS 2,972,841    Anderson _____ Feb. 28, 1961